Feb. 28, 1928.
M. VOS ET AL
1,660,774
METHOD FOR ELECTRICAL SEARCHING OF ORE
Filed Dec. 2, 1922
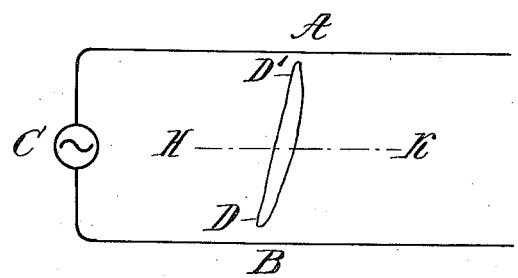
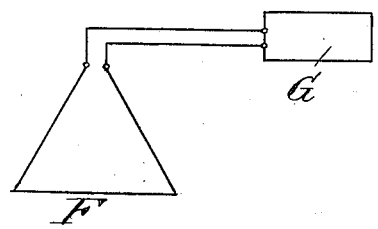
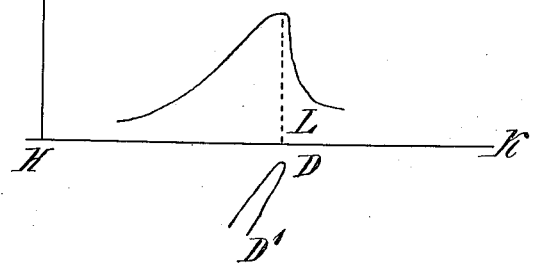
INVENTORS:
Mauritz Vos
Karl Sundberg
BY Wm Wallace White
ATT'Y.

Patented Feb. 28, 1928.

1,660,774

UNITED STATES PATENT OFFICE.

MAURITZ VOS, OF STOCKHOLM, AND KARL SUNDBERG, OF RASUNDA, SWEDEN, ASSIGNORS TO SVENSKA RADIOAKTIEBOLAGET, OF STOCKHOLM, SWEDEN, A JOINT-STOCK COMPANY LIMITED.

METHOD FOR ELECTRICAL SEARCHING OF ORE.

Application filed December 2, 1922, Serial No. 604,476, and in Sweden December 8, 1921.

The present invention relates to a method of detecting and locating, in a district, deposits or occurrences of ore and minerals, by electrical means. The invention is essentially characterized by the fact that by means of conductors connected to a source of alternating current electric current is transmitted to the ground directly, that is to say, in a galvanic manner, whereupon the strength of the magnetic field of the resulting currents is measured.

In order to explain the invention there is shown on the annexed drawing an embodiment of means for carrying out the method in question.

Fig. 1 shows diagrammatically a device for carrying out the present method. Fig. 2 shows, in a diagrammatic way, a device for determining the strength of the electromagnetic field of the current produced in the earth. Fig. 3 shows a diagram.

A and B are two separate electrical conductors laid on the ground and connected with a source of alternating current C, the current being transmitted to the earth by said conductors (electrodes) A, B for instance, by their being connected with the earth at a number of points. The strength of the electromagnetic field of the current produced in the earth is then determined, for instance, by means of the device diagrammatically shown in Fig. 2, which consists of the coil F and the voltmeter G. If the coil F is placed above a point within the current-carrying district, an electromotive force E (see Fig. 3) is by the electromagnetic field of the resulting currents induced in the coil, which electromotive force is measured by means of the voltmeter or vacuum tube of the thermionic type G. E is directly proportional to the number of lines of force traversing the coil surface and is, thus, a measure of the strength of the electromagnetic field in a direction perpendicular to the plane of the coil. The intensity of field in an arbitrary direction may, thus, be determined. If the district examined contains an ore body D—D¹ the strength of current will be larger at the point where the ore occurs and in the neighbourhood of the ore than if there were no ore present, on account of which the electromagnetic field generated by the current will be largest in the closest proximity to the ore. By determining the strength of the magnetic field at different points, for instance along the line H—K and in a direction parallel to the electrodes, the values diagrammatically indicated by Fig. 3 are obtained, i. e. the strength of field will have a top value at the point L by means of which the position of the ore is determined.

Instead of determining the strength of the electromagnetic field in one direction only it may be determined, for instance, in two directions perpendicular to one another, thus determining the intensity and the direction of the strength of field in a certain plane. Likewise the strength of field may be determined in three directions perpendicular to each other, giving as a result the strength and the direction of the field in space.

If the conductivity of the ground should be very small or, for any reason, the induced electromotive force be very small, an amplifier of any known design may be applied.

In order to obtain as simple readings as possible (i. e. measuring results which are easy to interpret) it is important that the lines of flow in grounds containing no ore (neutral ground) have a configuration as simple as possible. This is arrived at by giving the conductors or electrodes, supplying current to the ground a suitable shape, for instance, in galvanic supply of current, the shape of two parallel lines, two or more points, two concentric circles or a point and a circle, the point being the centre of the circle line etc. In certain cases, it may be suitable to give the electrodes the shape of a carpet in order to obtain a miximum contact surface in relation to earth. The electrodes may, thus, consist of points, lines or surfaces, or one or more points in combination with lines or surfaces, or finally one or more lines in combination with surfaces.

It will be clear that any suitable varying current may be employed such, for instance, as the use of a source of interrupted direct current instead of a source of alternating current; and it will also be understood that various changes may be resorted to in the form, construction and arrangement of the several parts without departing from the spirit and scope of our invention; hence, we do not intend to be limited to the details herein shown and described except as they may be included in the claims.

Having thus described our invention we declare that what we claim is:

1. A method of electrically detecting and locating deposits of ore which includes the following steps: supplying current to the earth by means of separate conductors in direct contact with the earth and connected to a source of current, and noting by means of an indicator out of direct contact with the earth the strength in certain directions of the electromagnetic field induced by the current supplied to the earth.

2. A method of electrically detecting and locating deposits of ore which includes the following steps: supplying current to the earth by means of separate conductors in direct contact with the earth and connected to a source of alternating current, and noting by means of an indicator out of direct contact with the earth the strength in certain directions of the electromagnetic field induced by the current supplied to the earth.

3. A method of electrically detecting and locating deposits of ore which includes the following steps: supplying current to the earth by means of separate conductors in direct contact with the earth and connected to a source of current, and noting by the aid of a secondary coil out of direct contact with the earth the strength in certain directions of the electromagnetic field induced by the current supplied to the earth.

4. A method of electrically detecting and locating deposits of ore which includes the following steps: supplying current to the earth by means of separate conductors in direct contact with the earth and connected to a source of alternating current, and noting by the aid of a secondary coil out of direct contact with the earth in certain directions of the electromagnetic field induced by the current supplied to the earth.

In testimony whereof we have signed our names to this specification.

MAURITZ VOS.
KARL SUNDBERG.